(No Model.)  W. C. ADAMS.  2 Sheets—Sheet 2.
GRAIN BINDER.

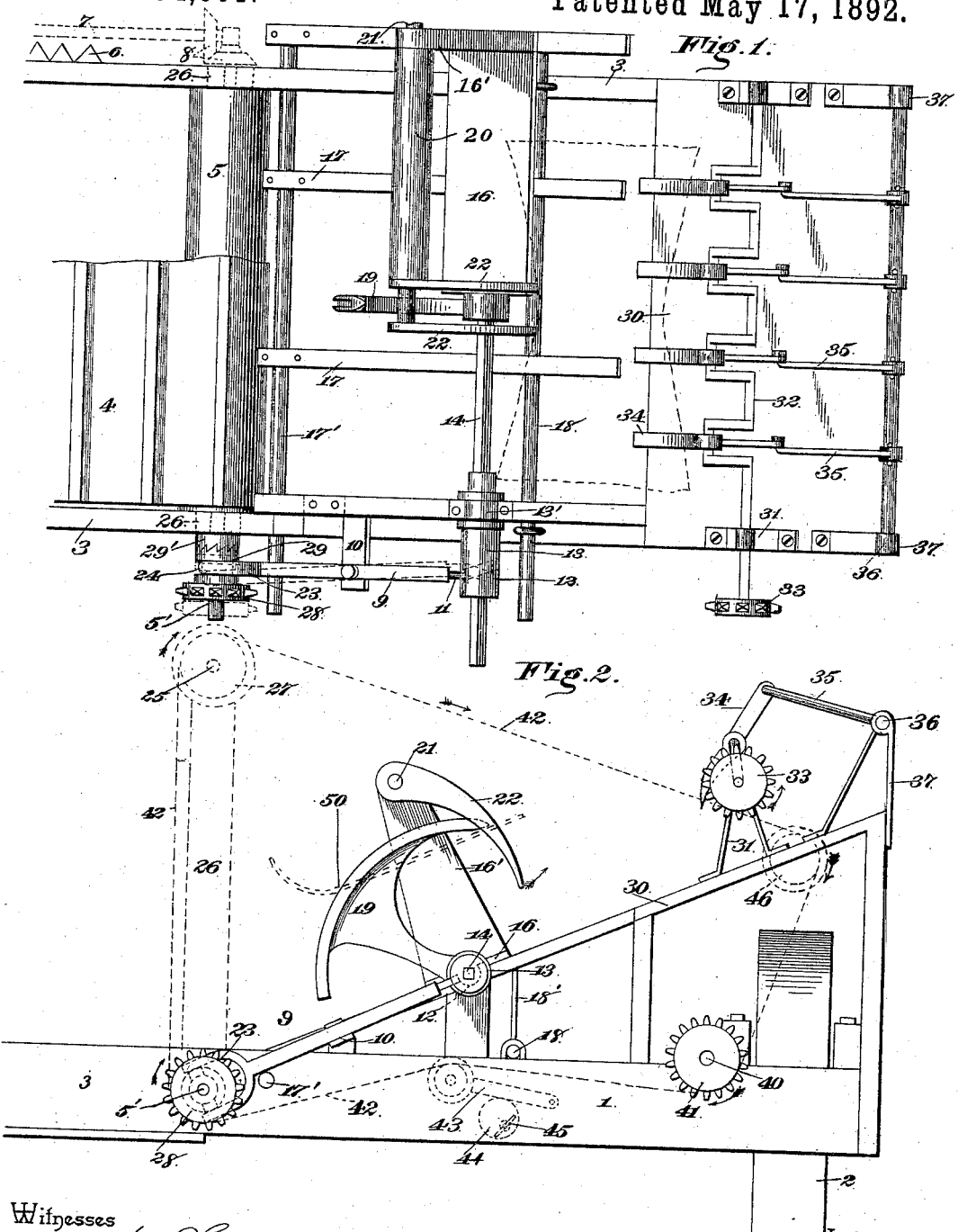

No. 474,801.   Patented May 17, 1892.

Witnesses  Inventor
  William C. Adams
By his Attorneys

UNITED STATES PATENT OFFICE.

WILLIAM C. ADAMS, OF STURGIS, KENTUCKY.

GRAIN-BINDER.

SPECIFICATION forming part of Letters Patent No. 474,801, dated May 17, 1892.

Application filed May 19, 1891. Serial No. 393,318. (No model.)

*To all whom it may concern:*

Be it known that I, WILLIAM C. ADAMS, a citizen of the United States, residing at Sturgis, in the county of Union and State of Kentucky, have invented a new and useful Grain-Binder, of which the following is a specification.

This invention relates to grain-binders; and its principal object is to provide a machine of this class in which the grain-apron may be stopped while the operation of binding is taking place, thus stopping the feed or the supply of grain to the binding mechanism temporarily.

With this end in view the invention consists in the improved construction, arrangement, and combination of parts, which will be hereinafter fully described, and particularly pointed out in the claims.

Figure 3:
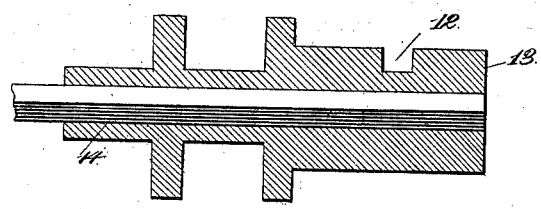
Figure 4:
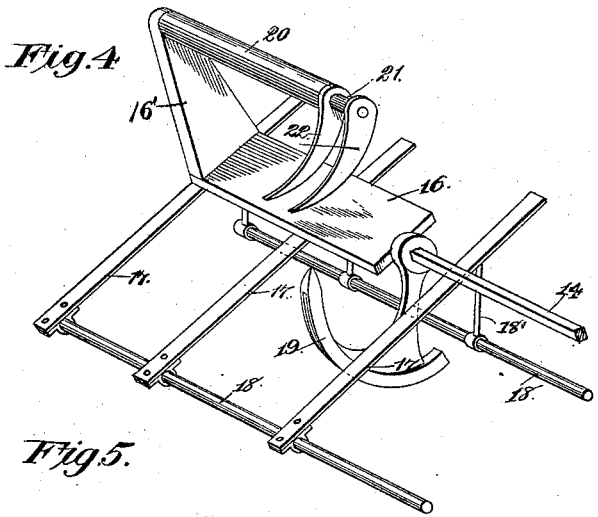
Figure 5:
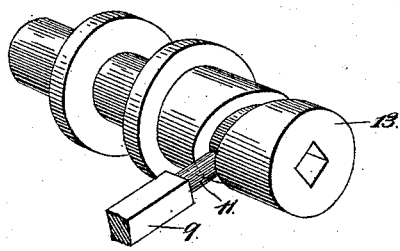

In the drawings hereto annexed, Figure 1 is a plan view of a portion of a grain-binder constructed in accordance with my invention. Fig. 2 is a side elevation of the same, showing the parts in position to bind a bundle. Fig. 3 is a longitudinal section through the center of the sleeve on the needle-shaft. Fig. 4 is a perspective view of the sliding frame carrying the needle, showing the latter in position to permit the grain to be fed over its tip. Fig. 5 is a perspective detail of the sleeve.

Referring to the said drawings, 1 is the main frame-work of this improved grain-binder, which is supported by the main wheel 2 and by the grain-wheel (not shown) at the outer or left end of the frame 3, which carries the apron 4, moving inwardly over an apron-roller 5 toward the supporting-wheel 2 in a manner which will be clearly understood. The cutting apparatus is indicated at 6 and stands along the front edge of the apron 4. The reel will be driven by the shaft 7, which is connected by gears 8 with a transverse shaft 25, extending rearward across the frame-work and having its bearings in uprights 26 thereon, the rear end of this shaft carrying a sprocket-wheel 27, which is driven in a manner hereinafter described. This reel and the mechanism for driving it form no part of the present invention and are merely described and illustrated in dotted lines in order to indicate their application to and position upon a machine embodying my improvements. The needle-shaft 14 is square and the needle 19 is secured thereon, as shown. Said shaft is journaled in bearings in a plate 16, which forms a part of the deck. Secured to said plate are straps 17, forming the deck-support, and which are connected at their lower front ends by a rod 17' and at their rear ends by arms 18', supporting a rod 18, these two rods sliding through the side bars of the base of the frame 1, and in this manner the entire deck, the needle-shaft, and the needle are adjustable in the frame for a purpose to appear hereinafter. The needle 19 is of any approved pattern and stands with its tip normally below the deck, through which it moves to tie a bundle. At the front end of said plate 16 is an upright 16', carrying a rearwardly-projecting tubular bearing 20, in which is journaled the knotter-operating shaft 21, and the ejector-arms 22 are keyed on this shaft in position to stand astride the needle when the latter is raised. The actuating mechanism for this shaft 21 is not shown; but its operation is the same as that of similar devices in machines of the character and as hereinafter described. Being supported by an upright from the deck, it will be understood that the ejector is adjusted with the deck when the latter is moved, and hence maintains its position relatively to the needle at all times.

13 is a sleeve journaled in a bearing 13' and having a square hole through its axial center, wherein fits the square needle-shaft 14, the latter sliding through this hole, but being turned with the sleeve.

9 is a lever pivoted between its ends in a bracket 10 of the frame and having a pin 11 at its inner end engaging a cam-groove 12 in the sleeve, and the outer end of this lever is forked, as at 23, and fits loosely in a groove 24 in the hub of a sprocket-wheel 28, this sprocket-wheel being mounted so as to slide on the shaft 5' of the apron-roller 5. 29 is a clutch member at the inner end of said hub, and 29' is another clutch member mounted on said shaft 5'. By this means the movement of the needle and of the sleeve slides said sprocket-wheel and its clutch member on the shaft of the apron-roller and disengages said members whenever the needle rises through the deck. Above the deck, which inclines upward and inward, as seen, is a table 30, continuing the deck over the supporting-wheel 2, and at the front and rear edges of this table are bearings 31, in which is journaled a crank-shaft 32, having on its rear end a sprocket-wheel 33, by which it is driven in a manner described below.

34 are the discharge-arms, pivotally mounted between their ends in the cranks of the shaft 32 and pivotally connected at their upper rear ends by links 35 with a transverse rod 36, mounted in brackets 37 across the upper end of the table.

40 is the main driving-shaft, which receives its power through suitable connections (not shown) with the supporting-wheel 2, and on the rear end of this shaft is a sprocket-wheel 41.

42 is a chain belt, which I have indicated by a single dotted line in order to avoid confusion, and this belt passes around the driving-wheel 41 over a suitable belt-tightener, as 43, which is adjusted by any means, as the eccentric 44, set by a thumb-nut 45, passes thence under the sprocket-wheel 28 on the apron-roller shaft, passes thence over the sprocket-wheel 27 on the shaft which drives the reel, passes thence under the sprocket-wheel 33 on the shaft which drives the discharge-arm, passes thence over an idle-wheel 46, carried by the table 30, and thence back to the point of starting.

The operation of this machine is as follows: The grain as it is cut falls on the apron 4, which delivers it to the deck, whereon it accumulates beneath the breast-plate 50, which is located about where seen in dotted lines in Fig. 2. At stated intervals the needle-shaft 14 is turned to cause the needle 19 to rise through the deck, thereby forming a bundle between the curved face of the needle and the usual compressor-arms, (not shown,) which stand in proper position to assist in making a bundle, as will be understood. As soon as the needle commences to rise the cam-groove 12 in the sleeve 13 turns the lever 9 on its pivot 10, disengages the clutch members 29 29', and thus stops the rotation of the apron-roller 5 and checks the feed of grain to the binding mechanism. Hence the grain which is cut while the bundle is being formed simply accumulates on the then stationary apron. The knot is tied by any suitable form of knotter. (Not here illustrated and forming no part of the present invention.) The needle then recedes, thereby setting the apron again in motion, and the knotter-operating shaft 21 is by its operating mechanism given a complete and rapid revolution, whereby the ejectors 22 are operated and the bundle is thrown off the deck onto the table 30. The rotation of the crank-shaft 32 in the direction indicated causes the discharge-arms 34 to reach down the table, grasp the bundle, draw it upward over the table, and drop it off the same on the stubble side of the machine. The employment of the belt-tightener above described, while not essential with chain-belts under ordinary circumstances, becomes useful in this case on account of the longitudinal movement of the sprocket-wheel 28, and hence the slight change in the size of the belt; but this change is so slight that the belt-tightener can be dispensed with entirely, if desired. As above stated, the reel and its connections form no part of the present invention. If the grain cut is long enough to lie completely across the apron, the needle, the knotter, and the ejector-arms are adjusted by sliding the deck so that such devices will stand, as seen in Fig. 1, at about the center of the length of the grain; but with shorter grain of course the bundles must be tied nearer the front edge of the apron in order that the binding-twine will pass around said bundles at their centers, and all these devices can be adjusted the frame-work to permit. At the same time said adjustment does not affect the automatic checking of the feed of the apron, which takes place whenever the needle is even partly above the deck, and hence avoids the undesirable feeding of the grain behind or in rear of the needle.

What is claimed as new is—

1. In a grain-binder, the combination, with the apron-roller shaft having a fixed clutch member, and a sprocket-wheel sliding thereon and having a clutch member, of the lever having a forked arm engaging an annular groove in the hub of said sprocket-wheel, a sleeve having a cam-groove engaging a finger at the opposite end of said lever, and a needle-shaft square in cross-section, having one end journaled in a sliding deck and its other end passing loosely through a square hole in said sleeve, substantially as described.

2. In a grain-binder, the combination, with the apron-roller provided with a clutch, driving mechanism to be engaged by said clutch and the needle-shaft, of the clutch-operating lever, and the sleeve on said shaft having a cam-groove for operating said lever, as and for the purpose set forth.

3. In a grain-binder, the combination, with the frame-work and an apron delivering thereinto at one end, of transverse rods sliding through said frame-work, arms rising from the inner rod, parallel inclined straps connecting the upper ends of said arms with the outer rod and forming the deck, a plate carried by said deck, a needle-shaft journaled in said plate and projecting to the rear across the deck, the projecting portion being square, a sleeve mounted in a bearing on the frame-work and having a square hole, through which said shaft passes loosely, a cam on said sleeve, driving mechanism for said apron, a clutch between said mechanism and the apron-roller, and connections between said cam and clutch for opening the latter when the needle rises, substantially as described.

4. In a grain-binder, the combination, with a frame-work, an apron delivering thereinto at its outer end, a table at the inner end of the frame-work standing over a supporting-wheel, a bearing on the frame-work, a sleeve journaled therein, and a lever actuated by the oscillation of said sleeve, of a clutch member on the apron-roller, a driven clutch member adapted to engage the same or to be disengaged therefrom by said lever, a deck inclining from said roller to the lower edge of said table and movable transversely of the frame-work, a needle-shaft journaled in said deck and having an angular projection passing through a hole in said sleeve, ejector-arms operating above and sliding longitudinally with said deck, a needle, and discharge-arms moving over said table, as set forth.

In testimony that I claim the foregoing as my own I have hereto affixed my signature in presence of two witnesses.

WILLIAM C. ADAMS.

Witnesses:
   D. A. BROOKS, Jr.,
   E. R. DYER.